United States Patent
Hollstedt

[19]

[11] Patent Number: 5,979,120
[45] Date of Patent: Nov. 9, 1999

[54] PARKING HOUSE FOR BICYCLES

[76] Inventor: Per Hollstedt, Ekerudmyra 14, N-1476 Rasta, Norway

[21] Appl. No.: 09/029,387
[22] PCT Filed: Aug. 30, 1996
[86] PCT No.: PCT/NO96/00214
§ 371 Date: Jun. 4, 1998
§ 102(e) Date: Jun. 4, 1998
[87] PCT Pub. No.: WO97/09498
PCT Pub. Date: Mar. 13, 1997

[30]     Foreign Application Priority Data

Sep. 1, 1995  [NO]   Norway ..................................... 953433

[51] Int. Cl.⁶ ..................................................... E04B 1/346
[52] U.S. Cl. ....................... 52/65; 52/236.1; 52/DIG. 14; 312/249.2; 312/267
[58] Field of Search ................. 52/65, DIG. 10, 52/DIG. 14, 64, 236.1, 236.2; 312/249.2, 267, 299, 305

[56]             References Cited

U.S. PATENT DOCUMENTS

| | | | |
|---|---|---|---|
| 1,593,665 | 7/1926 | Moores ......................................... | 52/65 |
| 2,736,628 | 2/1956 | Fadden, Jr. ................................ | 312/305 |
| 3,967,425 | 7/1976 | Wolverton et al. ..................... | 52/236.1 |
| 3,996,704 | 12/1976 | Huey ........................................... | 52/64 |
| 4,156,994 | 6/1979 | Steuer et al. ............................... | 52/65 |
| 4,612,741 | 9/1986 | Jacobson ................................ | 52/236.2 |
| 4,643,496 | 2/1987 | Dahl ..................................... | 312/299 |
| 4,697,856 | 10/1987 | Abraham ................................ | 312/305 |
| 4,969,300 | 11/1990 | Pope ........................................... | 52/65 |
| 5,690,234 | 11/1997 | Rhead et al. ....................... | 52/236.1 X |

FOREIGN PATENT DOCUMENTS

| | | |
|---|---|---|
| 43 07 481 A1 | 9/1994 | Germany . |
| 44 03 859 C1 | 3/1995 | Germany . |
| 2 030 550 | 4/1980 | United Kingdom . |
| WO 89/08578 | 9/1989 | WIPO . |
| WO 92/22718 | 12/1992 | WIPO . |

*Primary Examiner*—Carl D. Friedman
*Assistant Examiner*—Timothy B. Kang
*Attorney, Agent, or Firm*—Nath & Associates; Gary M. Nath; Gregory B. Kang

[57]            ABSTRACT

A house for parking bicycles so that bicycles can be placed separately in a circular storage area. The bicycles are positioned radially with the rear ends of the bicycles being directed toward the center axis of the house. The storage area of the house is provided with fixed walls and a door thus providing a closed room with at least one door. The floor of the area is sloped toward the center axis and is shaped as a double floor of which the inner floor is rotatable. The storage area is divided into stalls for placing the bicycle.

10 Claims, 4 Drawing Sheets

PARKING HOUSE FOR BICYCLES

BACKGROUND OF THE INVENTION

The invention concerns a house for parking bicycles of the type which is indicated in the introduction to claim 1.

Throughout the years the bicycle has been a popular means of transport, having been employed, e.g., as a means of conveyance to the starting point for further transport by tram or train, or people have cycled all the way to their destination.

In this connection there has been a problem with parking bicycles at such locations, the theft of bicycles being a frequent occurrence, even though they have been locked according to the book.

A need therefore exists for the development of a system for more secure parking facilities for bicycles.

It has been possible to solve this problem by fencing in areas which are guarded and where a fee is paid for installing the bicycle. Such solutions are expensive, however, due to the security and also occupy a relatively large amount of space.

Bicycle parking houses have also been developed previously, and examples thereof are described in WO-A-92/22718, WO-A-89/08578 and DE-C-44 03 859.

In the first of these publications there is described a bicycle parking arrangement which consists of a frame in which the bicycles are parked and where the frame can be rotated about a central axis. In order to park or retrieve the bicycle the frame is rotated to a vacant position or until the bicycle in question reaches a door. On the frame there are mounted holders for the bicycle, and the bicycle is locked in these holders. When removing the bicycle the holder device is pulled out and the bicycle can be unlocked from the holder and removed. This bicycle parking arrangement has a relatively complicated frame and holder design and it will be possible for unauthorized persons to enter the parking area, e.g. by paying for parking a bicycle, whereupon acts of vandalism can be carried out or parts can be removed from other bicycles.

In WO-A-89/08578 a bicycle parking arrangement is described where the bicycles are placed in separate, triangular stalls, where the bicycle is firmly wedged in the stall. Each stall is designed with its own door and a key system in order to ensure that no one else can gain access to the stall. Such stalls can be arranged in twos in rectangular units or also assembled to form a circular unit. The arrangement requires a relatively large amount of space, since it must be possible to reach it from all sides, each space having its own opening.

Furthermore, in DE-C-44 03 859 there is described a bicycle parking arrangement in which, in a similar fashion to the aforementioned system, the bicycles are placed in separate stalls in the form of triangles, which can be placed in a circle. The special feature of this arrangement is that entry ramps have also been provided for parking on two storeys for better utilization of space. This arrangement, however, has the same basic construction as the aforementioned unit, each stall having its own door opening.

SUMMARY OF THE INVENTION

The object of the invention is to provide a bicycle parking house which has improved characteristics in comparison with these previously known designs, where the house will occupy a minimum of space, where bicycles can be stored safely and without the possibility of others coming into contact with the bicycle and where there is a central retrieval point, with the result that the bicycle parking house can be situated, e.g., in confined locations, in which the previously known arrangements could not be incorporated.

A further object is to make the bicycle parking house as secure as possible. Thus it should also be secured in such a manner that it is possible to leave cycle accessories such as cycle bags, helmets, etc.

These objects are achieved with a house of the type mentioned in the introduction which is characterized by the features presented in the claims.

In the design according to the invention a parking house for bicycles is provided in which the bicycles can be placed in a minimum of space, and where the bicycles will slide into the correct storage space more or less automatically. The controlled rotation of the house will guarantee that there will only be access to the one stall in which the bicycle is stored without the possibility of gaining access to any of the other stored bicycles. With an admission control system, e.g. a code/lock system, it can be ensured that there will only be access to the storage stall when the stall is stationary. Moreover, the design of the house makes it possible to place several units on top of one another and/or beside one another. It will then be possible to provide advantageous facilities for access to the doors in the different storeys or the different sections of the house arrangement possibly from an outer house which surrounds the actual storage house, and through which outer house the bicycles can be wheeled, e.g., up and down. Each storage house will function technically as a separate unit. Such houses may be round, rectangular, octagonal, etc. The material used can be concrete, wood, metal, plastic, etc.

The design and materials are dependent on aesthetic/practical/cost considerations.

The invention will now be described in more detail by means of an embodiment which is illustrated in the drawing, in which:

DETAILED DESCRIPTION OF THE INVENTION

Figure 1:
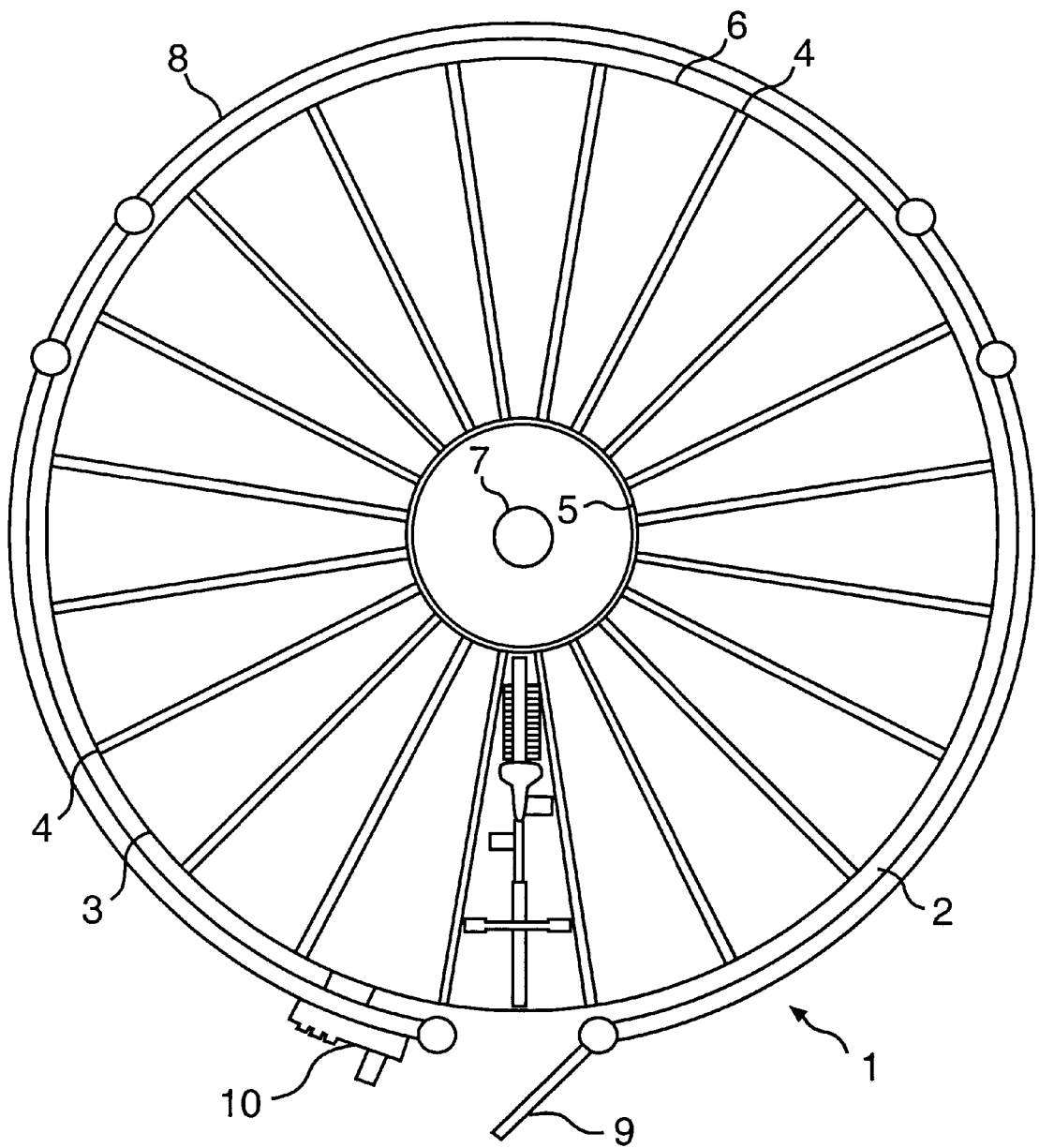
FIG. 1 is a schematic sectional view of a bicycle parking house according to the invention.
Figure 2:
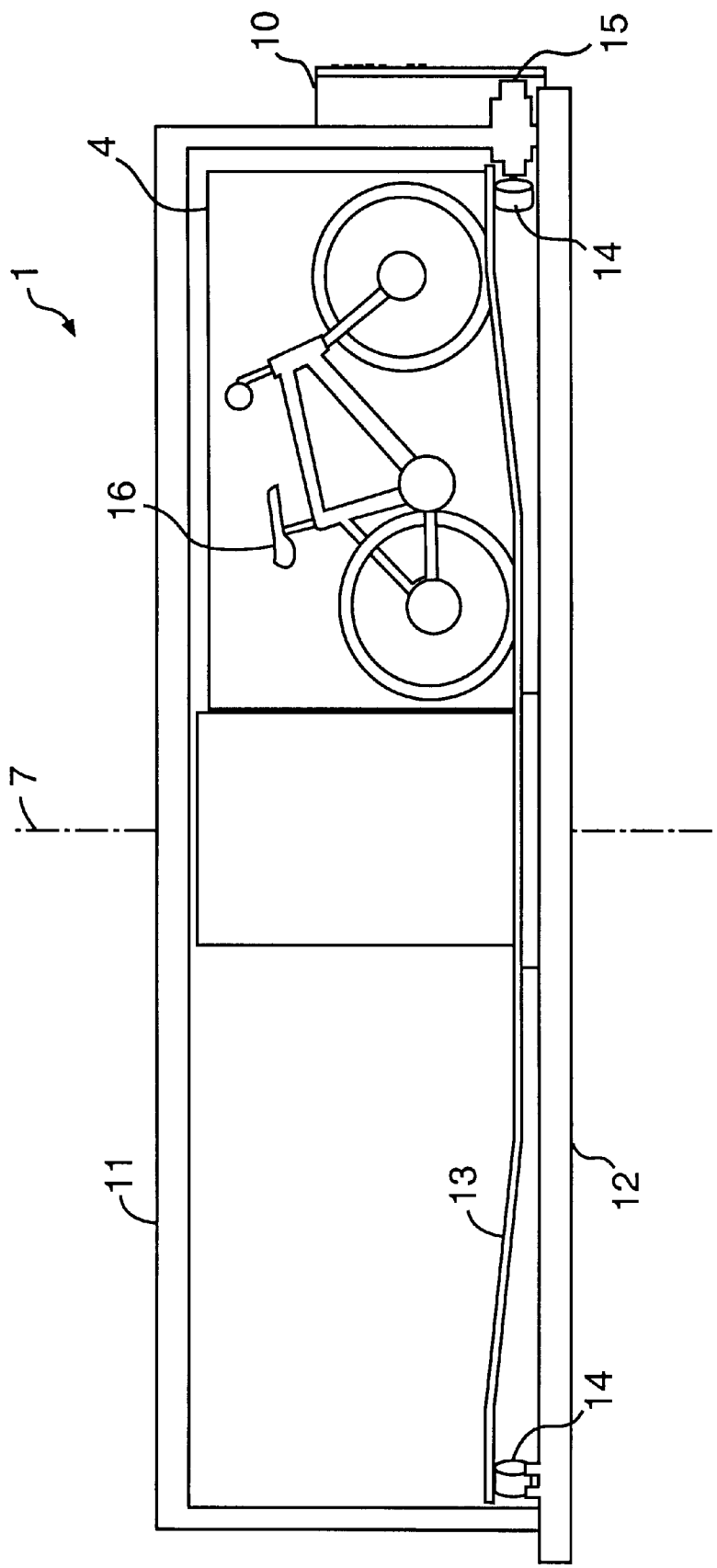
FIG. 2 is a section through a bicycle parking house according to the invention.

The house for parking bicycles according to the invention is schematically illustrated in FIG. 1, where the actual house is indicated by 1. The interior of the house is composed of a storage space 2, which is divided into pie section-like stalls 3 which are separated from one another by fixed and solid walls 4. Alternatively, in addition to radial walls 4 there can also be provided inner walls 5 and possibly an outer barrier from the bicycle at 6. The house 1 which is illustrated in FIG. 2 has a floor 12 with an internal floor 13. This internal floor 13 is rotatable about the house's centre axis 7 by means of a drive system consisting, e.g., of castors 14 or a ball bearing mechanism, which is driven round by a motor 15. Many variations in the design can be employed here. The actual inner floor 13 is designed sloping slantingly downwards in the direction of the centre axis 7, as illustrated in FIG. 2. The roof of the house is indicated by 11, and a bicycle 16 is illustrated schematically placed in a stall.

When a bicycle 16 has to be placed in a stall in the storage space, an admission control system 10 is activated at the door 9 in the house's outer wall 8. The system may be designed, e.g. as a card reader system or ticket/payment system which works digitally or electronically, where time can also be recorded, either in advance or the time duration for bicycle parking. The system can be of any known type whatever. The system 10 is programmed in such a manner that an unused stall 3 is placed right in front of the door opening 9. When the rotation stops the door can be opened, and the owner of the bicycle can place it in the stall, close the door and take his code card which defines the special stall. When the next person wishes to install his bicycle, the code/lock system 10 is activated, a new stall advances and a new bicycle can be inserted.

When the bicycle has to be retrieved this process is carried out in reverse order. As already stated, lock/code control systems of a known type which are on the market can be employed. By means of this arrangement the storage of the bicycle is secured in a satisfactory manner.

Figure 3:
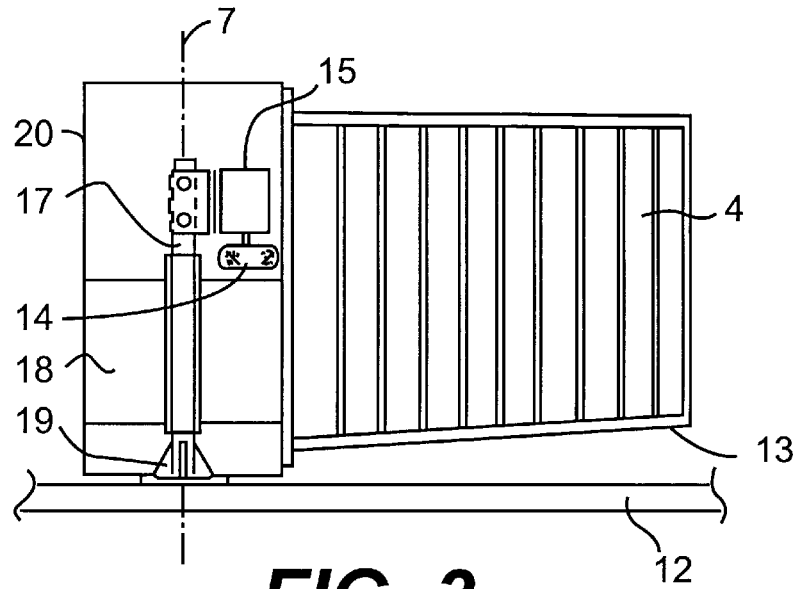
FIG. 3 is a similar section in a second embodiment of a bicycle parking house according to the invention, in a partial view.

In FIG. 2 a version is illustrated with a double floor and in which the stalls are rotated by a castor 14 provided in the outer edge, which castor is driven by the motor 15. FIG. 3 shows another alternative design where the drive device is provided centrally. In this version the inner walls 6 are in the form of a central column 20 which is rotatable about the axis 7. The walls 4 and the inwardly sloping floor 13 are attached to this column 20 by suitable means, with the result that the walls radiate from the column freely without any other support. This requires a relatively strong construction for the column 20 and a reinforcement 18 can, e.g., be rotatably mounted on a central post 17. In the figure the walls 4 are illustrated as a boarded wall with circumferential frames, where the lower frame portion supports the floor 13. The floor 13 can also be suspended in the wall frame. A person skilled in the art will be able to find a suitable solution here. The outer floor 12 can be omitted or reduced to a support foundation for the column 17. The post 17 also constitutes the support member for the drive device for rotation of the column 16 and thereby walls 4 and floor 13, i.e. the stalls 3. By means of a suitable mounting device a motor 15 is attached to the post 17. The motor 15 drives a wheel 14 with a friction surface of rubber which is in frictional engagement with the inside of the column surface. Thus by running the motor the column 17 will be rotated. The column is rotatably mounted, e.g., on bearings in the foot member 19. Many modifications will be possible here for a person skilled in the art.

Figure 6:
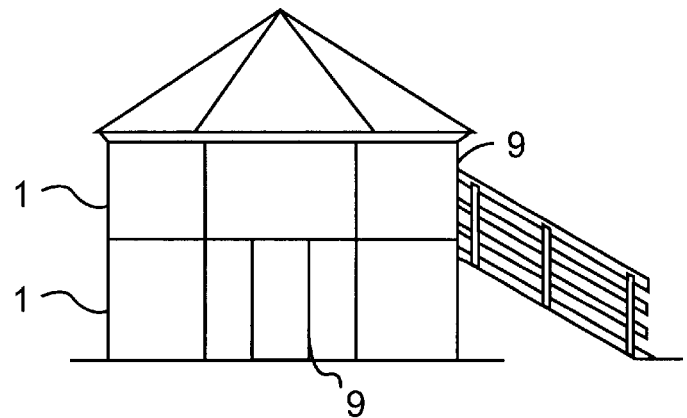
FIG. 6 is a further two-storey version of a house according to the invention, viewed from the side and from above.
Figure 6:
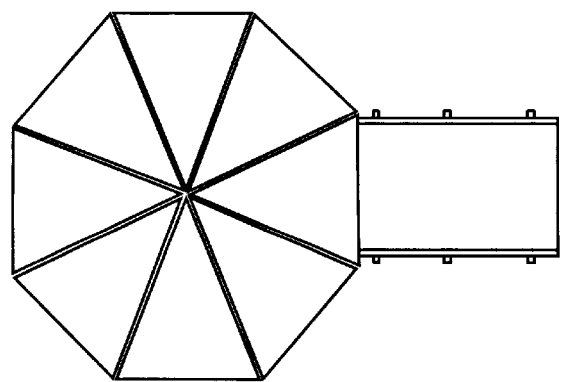
Figure 4:
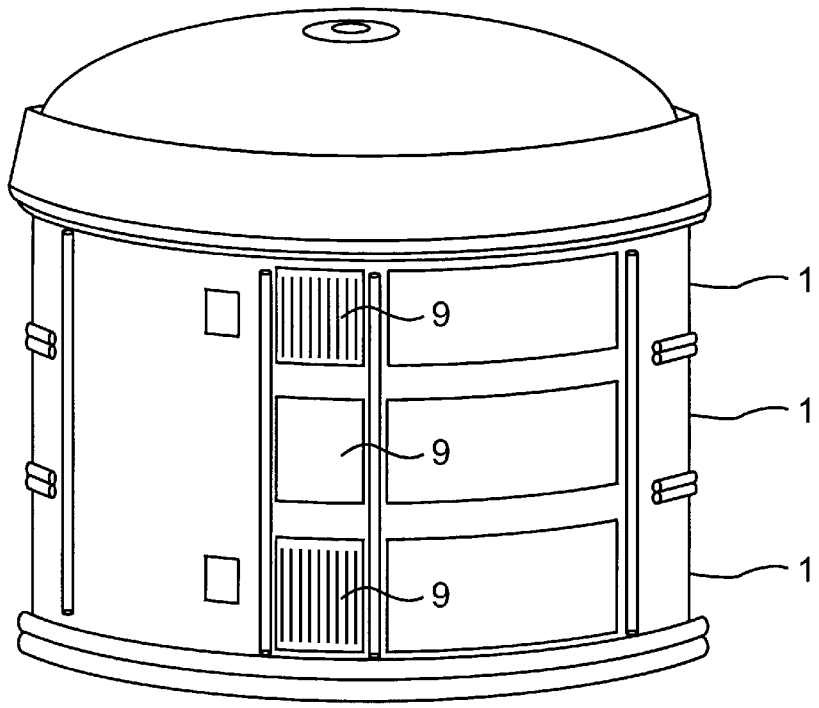
FIG. 4 is an embodiment of a bicycle parking house according to the invention, where three house units are provided on top of one another.
Figure 5:
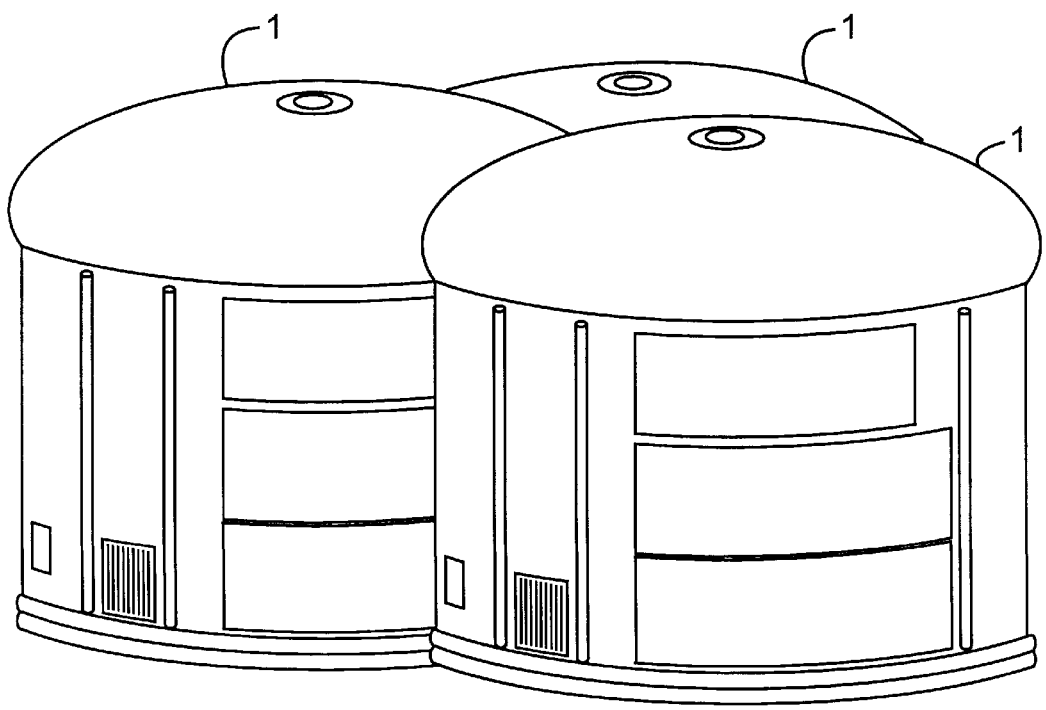
FIG. 5 is a version where three houses according to FIG. 4 are combined with one another.

The advantage of the house according to the invention is that it requires access from only one point, viz. where the door is located. In some cases two doors may be required, i.e. another door on the opposite side or something similar, but in reality this can be equated with the use of only one door, since only one door will be able to be in operation at a time. For reasons of space it will be possible to place several house units on top of one another as illustrated in FIG. 3, and several such house units can also be combined as illustrated in FIG. 5. In FIG. 6b a variation is illustrated with an octagonal outer house with two parking levels. The house is intended for a design in a wooden material, where a wall design in wood, e.g. as described in FIG. 3, will then be suitable. The principles, however, remain the same. The design of the actual house is preferably aesthetically suited to the environment and the bicycles will be extremely well located with regard to being theft-proof. Many designs will be possible for the drive system for rotation of the storage space or the stall. Even though these systems are illustrated, other systems will also be conceivable and different types of ball bearings, tooth guides etc can be used. The use of a double floor can be especially advantageous in the area by the door, thus ensuring that the stall is completely secured in this area. In multi-storey designs, the floor will also form the roof of the underlying stall.

I claim:

1. A house for parking bicycles comprising a circular storage area having a center axis so that the rear ends of a plurality of bicycles can be directed towards the center axis of the area, wherein the house is comprised of fixed outer walls, at least one door, a floor and roof, thus providing a closed room with said at least one door, wherein said floor of the storage area is a rotatable floor which rotates about said centre axis, and which slopes downwards in the direction of said centre axis, and said storage area has a wall system which rotates with the floor and which divides said storage area into pie section-like stalls with width and length dimensions capable of housing a bicycle, and that the width of the door corresponds to the largest front opening of the stalls.

2. A house according to claim 1, characterized in that the rotation of the storage area or the stalls and access through said door is controlled by a digital or electronic admission control system, with time control.

3. A house according to claim 1, characterized in that the storage area is equipped with means for locking the stalls against rotation when the door is open, or when a person is in one of the stalls.

4. A house according to claim 1, characterized in that a plurality of storage areas can be placed on top of and/or beside one another.

5. A house according to claim 4, characterized in that the storage areas have common outer walls, when placed on top of and/or beside one another.

6. A house according to claim 1, characterized in that the wall system is mounted on a rotating central column in the house.

7. A house according to claim 6, characterized in that the wall and floor are rotated by a motor in the central column.

8. A house according to claim 1, characterized in that the floor is suspended in the lower area of the walls.

9. A house according to claim 1, characterized in that the walls and floor are rotated by motor-driven wheels in the floor's peripheral area.

10. A house according to claim 1, characterized in that there is provided a fixed floor under the rotating floor, at least in the area corresponding to a stall placed beside the door.

* * * * *